(12) United States Patent  
Cotter (10) Patent No.: US 7,743,729 B2  
(45) Date of Patent: Jun. 29, 2010

(54) PORTABLE SYSTEM FOR AUTOMATICALLY AND PERIODICALLY APPLYING MOISTURE TO CURING CONCRETE

(76) Inventor: Jerry Cotter, 4845 Trail St., Norco, CA (US) 92860

( * ) Notice: Subject to any disclaimer, the term of this patent is extended or adjusted under 35 U.S.C. 154(b) by 1231 days.

(21) Appl. No.: 11/250,976

(22) Filed: Oct. 14, 2005

(65) Prior Publication Data

US 2007/0084508 A1   Apr. 19, 2007

(51) Int. Cl.
*B05C 11/00* (2006.01)

(52) U.S. Cl. .................................. 118/712; 137/561 A (58) Field of Classification Search ................. 118/712; 137/561 A
See application file for complete search history.

(56) References Cited

U.S. PATENT DOCUMENTS

| 2,003,988 | A |   | 6/1935 | Angier |
|-----------|---|---|--------|--------|
| 2,963,765 | A |   | 12/1960 | Tillman |
| 4,485,137 | A |   | 11/1984 | White |
| 5,187,882 | A | * | 2/1993 | Leach ........................ 34/389 |
| 5,611,369 | A |   | 3/1997 | Hamann, Jr. |
| 5,707,179 | A |   | 1/1998 | Bruckelmyer |
| 5,780,367 | A |   | 7/1998 | Handwerker |
| 5,838,880 | A |   | 11/1998 | Brooks, Jr. et al. |
| 5,855,978 | A |   | 1/1999 | Handwerker |
| 2003/0041407 | A1 | * | 3/2003 | Savage ........................ 15/321 |
| 2003/0124315 | A1 |   | 7/2003 | Grochoski |
| 2003/0157302 | A1 |   | 8/2003 | Handwerker |
| 2005/0220541 | A1 | * | 10/2005 | Corbitt ........................ 404/112 |

FOREIGN PATENT DOCUMENTS

JP       11324327       11/1999

OTHER PUBLICATIONS

International Search Report and Written Opinion for Corresponding PCT Application No. PCT/US2006/040552.

* cited by examiner

*Primary Examiner*—George R Koch, III
(74) *Attorney, Agent, or Firm*—Knobbe, Martens, Olson & Bear, LLP (57) ABSTRACT

A system for automatically and periodically applying moisture to curing concrete that can be transported from one location to another is provided. A portable concrete curing unit receives water from a water source and distributes such water to a moisture applicator that is situated near a curing concrete object. The moisture applicator applies moisture to the curing concrete so as to maintain the concrete object at a desired moisture level during the curing process. The concrete curing unit may contain a power source, a pump, and a controller. The controller is connected to the pump such that the pump will distribute water to the moisture applicator during an activation period. This timing function of the controller allows for a system and method of automatically and periodically curing concrete that can be controlled by the user without extensive need for manual labor during the concrete curing process.

40 Claims, 8 Drawing Sheets

PORTABLE SYSTEM FOR AUTOMATICALLY AND PERIODICALLY APPLYING MOISTURE TO CURING CONCRETE

BACKGROUND OF THE INVENTION

1. Field of the Invention

The present invention generally relates to curing concrete. More particularly, the present invention relates to a portable system and method for automatically and periodically applying moisture to concrete to ensure proper curing of the concrete. The present invention is portable and can be used with concrete columns, walls, floors, and other concrete items.

2. Description of the Related Art

Concrete typically results from mixing various ingredients including cement, sand, and water. In order to obtain concrete with the most desirable characteristics, concrete must be kept moist for a sufficient period of time after mixing its ingredients. This process is known as curing or hydration. If cured properly, the strength and durability of concrete can be significantly increased since a water-tight concrete substance can be produced. Water-tight concrete is less likely to fracture upon application of a given force than concrete with air pockets and other imperfections. The desired curing period for concrete typically ranges from a few days to several weeks. During this time, appropriate moisture conditions should be continuously maintained throughout the concrete substance.

One method of curing concrete is by use of a concrete curing blanket. A curing blanket typically comprises a large burlap blanket, often in ten feet by forty feet pieces, covered with a plastic material. The curing blanket is placed on the recently mixed concrete and the burlap side of the blanket, which is in contact with the concrete, is periodically wetted in order to maintain moisture on the surface of the concrete. The curing blanket can require rewetting every six to eight hours or less depending on ambient weather conditions. As a result, the curing blanket typically must be rewetted many times during the curing period.

In order to rewet the curing blanket, workers typically use a large hose, connected to a water source, to spray the burlap portion on the underside of the blanket. A gas powered pump is often required in order to provide sufficient water pressure to the large hose. This process requires significant manual labor since the curing blanket must be physically lifted to access the burlap underside and since rewetting, in some cases, may be necessary hourly. In addition, workers often must use a large and heavy hose, similar to a fireman's hose, to spray the curing blanket. The hose discharges substantial amounts of water and therefore a significant amount of water does not reach the curing blanket and ends up on the ground or elsewhere. As a result, this process can waste a significant amount of water and result in a messy work site condition. Another disadvantage is that the cost and labor required to rewet the curing blanket may be significant. In addition, since this process relies on manual labor, error is possible since a worker may forget to rewet the curing blanket or may wet the blanket with too much or not enough water. Human error can result in significant monetary and temporal consequences. According to certain government regulations, if a worker forgets to spray the curing blanket and the concrete structure does not pass certain inspections, then the concrete structure may have to be rebuilt completely resulting in a loss of time and money for the builder.

Another method used to cure concrete is by placing wet concrete in an enclosed curing room for the entire curing period. However, this method has significant limitations. The curing room is not portable and therefore cannot house concrete items commonly developed at a construction site such as concrete columns, a concrete wall, or a large concrete floor. In addition, human error is a problem since this method relies on human involvement in turning the watering device on and off.

Therefore, systems and methods for automatically applying moisture during the curing period with minimal human involvement are desired. In addition, portable, automatic, curing systems and methods that may be transported to a construction or other work site where large, heavy concrete structures are to be cured are desired.

SUMMARY OF THE INVENTION

The present invention overcomes these and other problems that are inherent with existing concrete curing blankets and similar systems for curing concrete. The present invention concerns a portable system for automatically and periodically applying moisture to curing concrete. The system is portable and allows for the automatic and periodic curing of concrete columns, walls, floors and other concrete items at a particular location without significant manual labor or operating costs.

In one embodiment, a concrete curing apparatus that can be transported from one location to another is provided. The concrete curing apparatus is configured so as to provide water from a water source onto a concrete object during the curing process. The concrete curing apparatus contains a power source that provides power to a pump. The pump provides pressurized water to a moisture applicator which is situated on or near the curing concrete object. A controller activates and deactivates the pump so that a user can configure the concrete curing apparatus to apply water to the moisture applicator according to a predetermined schedule. The power source, pump, and controller are mounted on a movable chassis, such as a trailer, which can be transported from one construction location to another. As a result, the apparatus is portable and can automatically and periodically apply moisture from a water source onto a concrete object so as to provide the optimal curing conditions for the concrete object.

In another embodiment, a method of automatically and periodically applying moisture to concrete so as to facilitate in the curing of a concrete object comprises positioning a moisture applicator near the outer surface of a concrete object, transporting the moisture applicator and a controller to the location of the concrete object, coupling the moisture applicator to a water source so that the applicator spreads moisture over the outer surface of the concrete object, programming the controller to periodically provide water to the moisture applicator during a curing period so that a desired moisture level is maintained on the surface of the concrete object, and initiating the controller so that the controller provides water to the moisture applicator and automatically maintains a desired moisture level on the surface of the concrete object.

In another embodiment, a system of automatically and periodically applying moisture to curing concrete in a remote location comprises a portable chassis, a water pump positioned within the chassis, a water reservoir positioned within the chassis, an applicator that can be positioned near the curing concrete object, and a controller that is positioned within the chassis and can control the operation of the pump in order to maintain a desired moisture level on the surface of the concrete object. In one embodiment, the system further comprises a moisture sensor that senses the moisture on the concrete object and relays a signal when the moisture falls below a threshold level. In another embodiment, the system further comprises a water level sensor that senses the water level of the water reservoir and relays a signal when the water level falls below a threshold level. Both the moisture sensor and the water level sensor can contain a pager which transmits a signal to a paging device when the moisture sensor and/or the water level sensor detect moisture and/or water below a threshold level.

DETAILED DESCRIPTION OF THE PREFERRED EMBODIMENT

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
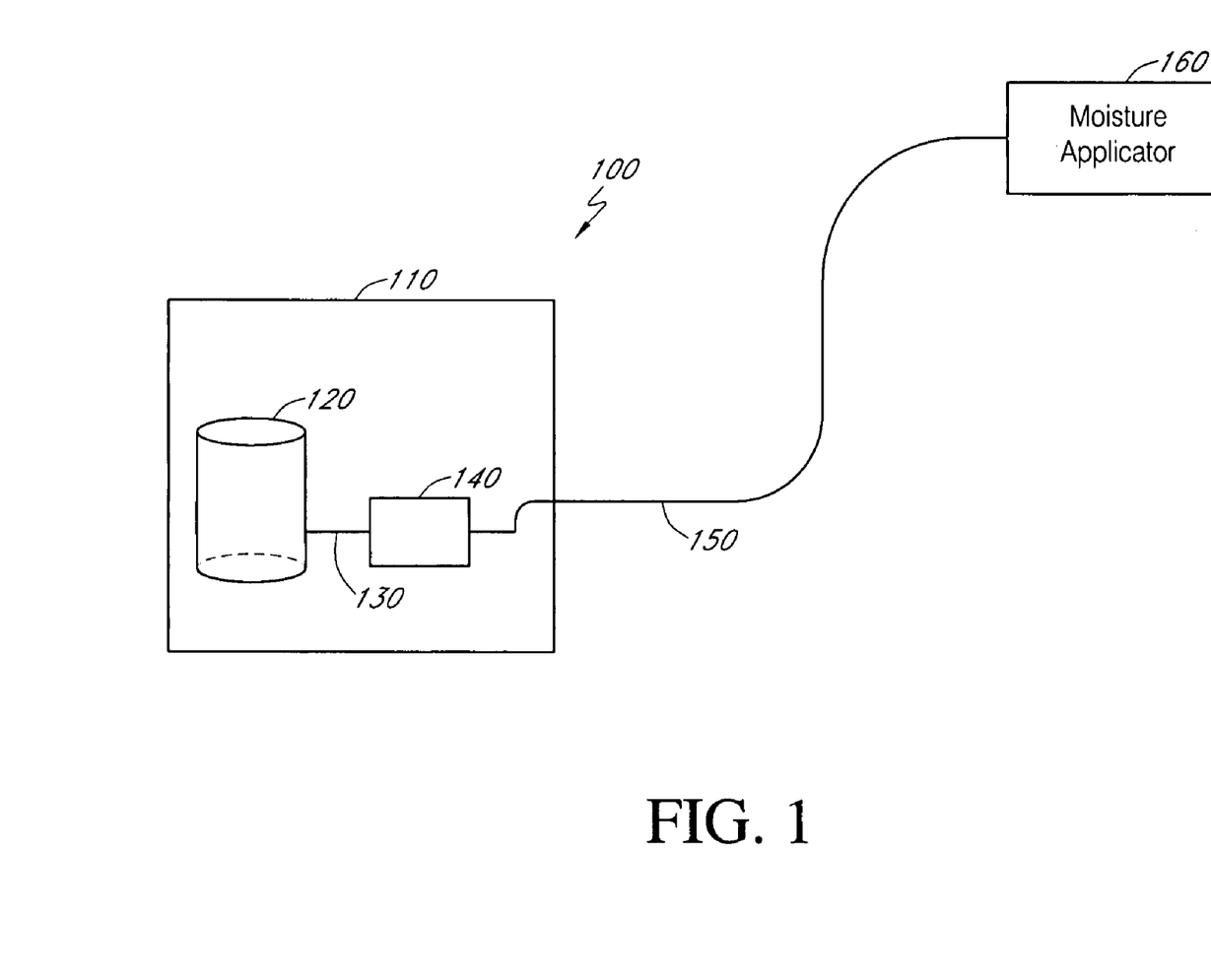
FIG. 1 is a block diagram of a portable system for automatically and periodically curing concrete.

FIG. 1 illustrates an exemplary portable system for automatically and periodically curing concrete 100. As shown in FIG. 1, the portable system for automatically and periodically curing concrete 100 generally comprises a movable chassis 110, which contains a water source 120 and a portable self-contained concrete curing unit 140. The concrete curing unit 140 is connected to the water source 120 by means of a coupling unit 130. In addition, the concrete curing system 100 generally includes a moisture applicator 160, which is connected to the concrete curing unit 140 by means of a moisture coupling unit 150.

In one embodiment, the movable chassis 110 is a trailer device in which both the water source 120 and the concrete curing unit 140 are mounted thereon. The trailer device is attached to a motor vehicle equipped for transporting trailers and their contents. Advantageously, the movable chassis 110 can be transported from one location to another location providing for a portable system of curing concrete. This portable system enables concrete objects to be cured at their final location and eliminates the need to cure concrete in one particular location and then transport the heavy concrete object to its desired destination. As a result, transportation costs are reduced and the time needed to complete a particular project involving curing concrete is likewise reduced. In addition, by including the water source 120 on the movable chassis 110 in this particular embodiment, the concrete curing system 100 may be utilized in any location regardless of whether the location has an accessible water source. Some construction projects take place in remote locations where it would take considerable time and effort to access a water source for an extended period of time, as is necessary when curing concrete. This embodiment enables concrete to be cured at remote locations since the water source 120 is included on the movable chassis 110 and can be transported to any desired concrete curing location.

In one embodiment, the water source 120 comprises a water tank having a 750 gallon capacity. As discussed in more detail below, the automatic and periodic nature of applying moisture to curing concrete will enable this 750 gallon water tank to provide water to the concrete curing unit 140 for approximately two or more days. However, the volume of the water tank can be larger or smaller depending on a user's particular preference. If a user is curing concrete in a remote location, perhaps a larger capacity tank is preferable such as a 1,000 gallon or 1,500 gallon water tank. In addition, the water source 120 is not limited to a water tank but can include other means of storing and providing water such as, but not limited to, a public water supply including rivers, reservoirs, lakes, and groundwater.

In one embodiment, the water source 120 is a water tank with a water level sensor attached thereon. The function of the water level sensor is to monitor the water level in the water tank and notify the user when the water level falls below a certain threshold level. The sensor could, by way of example, contain a pager that alerts the user of the concrete curing system 100 that the water level is low and water should be added to the water tank. Alternatively, or in addition to, the water tank could contain certain signals that activate a light alert on the water tank itself when the water in the tank is too low. In another embodiment, the curing unit 140 contains a pager and/or lights that alert the user when the water level in the water tank falls below a minimal threshold level. Advantageously, these pager and/or light alert systems allow the user to operate the concrete curing system 100 with minimal human supervision and involvement.

Figure 2:
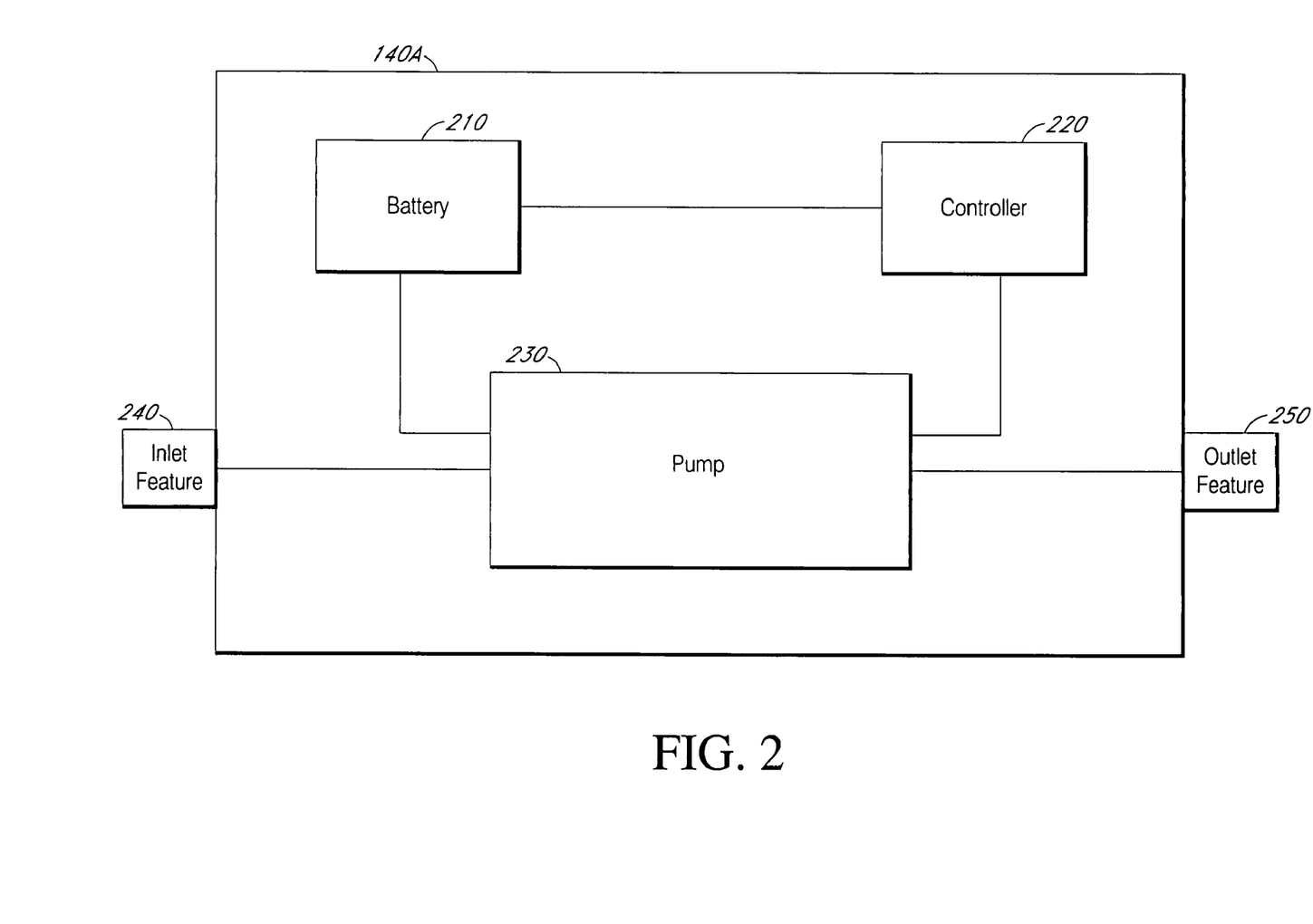
FIG. 2 is a block diagram illustrating components of the exemplary portable self-contained concrete curing unit of FIG. 1.

In another embodiment, the water source 120 is connected to the concrete curing unit 140 by use of a coupling unit 130. The coupling unit 130 may be a water hose with threaded connectors that securely attaches at one end to the water source 120 and at the other end to the curing unit 140. In one embodiment, the concrete curing unit 140, the components of which are described in detail below in reference to FIG. 2, is a self-contained unit that is mounted on the movable chassis 110. Advantageously, the concrete curing unit 140 comprises components that automate the process of applying moisture to curing concrete so that the concrete cures properly with minimal human intervention. In another embodiment, the concrete curing unit 140 is not mounted on the movable chassis 110. In such embodiment, the concrete curing unit 140 can be transported to a curing site separate from the water source 120. For example, if an on-site water source is convenient and available, the concrete curing unit 140 could be transported in the bed of a standard pickup truck, or similar motor vehicle, to the curing site and then coupled to the on-site water source.

As shown in FIG. 1, the concrete curing unit 140 is connected to the moisture applicator 160 by use of a moisture coupling unit 150. In one embodiment, the moisture coupling unit 150 comprises a hose made of rubber, thermoplastic, Teflon, composite material, stainless steel, vinyl or any other suitable material. In the embodiment illustrated in FIG. 1, the moisture applicator 160, which is described in more detail below, comprises a curing blanket and a hose. In one embodiment, the curing blanket is placed on the concrete surface needed to be cured and the moisture coupling unit 150 transfers pressurized water from the concrete curing unit 140 to a hose contained on the underside of the curing blanket. As a result, the curing blanket maintains a desired moisture level which in turn acts to keep the curing concrete sufficiently moist so as to cure the concrete properly.

In one embodiment, the moisture applicator 160 contains a moisture sensor that monitors the water level on the moisture applicator 160. For example, the moisture sensor detects how much moisture is on the surface of the concrete curing blanket. If the moisture level on the blanket is sufficient, then the moisture sensor will relay a signal back to the concrete curing unit 140 and the concrete curing unit 140 will no longer provide pressurized water to the moisture applicator 160. When the moisture level on the blanket falls below a certain level, then the concrete curing unit 140 is electronically instructed to reapply water to the moisture applicator 160 until a desired moisture level is maintained on such moisture applicator 160. In another embodiment, the moisture applicator 160 contains a moisture sensor that monitors the water level on the surface of the curing concrete object itself. In such embodiment, the sensor similarly will relay a signal back to the concrete curing unit 140 when the water level on the surface of the concrete object falls below a minimally suitable moisture level.

FIG. 2 is a block diagram illustrating components of the exemplary portable self-contained concrete curing unit 140A of FIG. 1. An inlet feature 240 of the concrete curing unit 140A is configured to receive water from the water source 120 by way of the coupling unit 130. The inlet feature 240 transfers water to an exemplary hose which in turn transfers water to a pump 230. The water is pressurized in the pump 230 and transferred to an outlet feature 250 of the concrete curing unit 140A by means of another exemplary hose. The outlet feature 250 is configured to transport pressurized water to the moisture applicator 160 via the moisture coupling unit 150. In one embodiment, the inlet feature 240 and the outlet feature 250 are threaded male circular openings approximately one inch in diameter. However, the inlet feature 240 and the outlet feature 250 can be a variety of sizes and shapes and need not be threaded or male in configuration.

In one embodiment, the power source is a battery 210 which provides power to the pump 230. In addition, the battery 210 may provide power to a controller 220 which is likewise connected to the pump 230. The controller 220 functions to periodically activate the pump 230 so as to periodically apply moisture to the concrete object that is being cured. The controller 220, which is described in more detail below in reference to FIG. 8, may also be configured to automatically discharge pressurized water from the pump 230 in accordance with a particular time schedule set in advance by the user. Therefore, the combination of the controller 220 and the pump 230 automatically and periodically provide water to the moisture applicator 160, which assists in properly curing concrete items. Advantageously, manual labor associated with spraying the curing blanket with a large hose is not necessary and human error inherent in the curing process is decreased since there is less reliance on human involvement due to the automatic nature of applying water to the curing concrete object provided by the present embodiment.

The pump 230 can be a variety of sizes and shapes having many different water flow capacities. For example, in one embodiment, the pump 230 has a 6 gallon per minute flow capacity which can provide suitable pressurized water for the purpose of applying moisture to curing concrete. For particularly large items of concrete, such as large concrete walls or columns, a pump with a greater flow capacity is desirable in order to ensure that sufficient pressurized water can be transferred to the moisture applicator 160.

In one embodiment, the battery 210 acts as a power source so as to provide suitable power to the pump 230 and the controller 220. The battery 210 can include multiple batteries and, in one embodiment, two six volt batteries connected in series are used. Such configuration may permit the battery 210 to supply power to the controller 220 and pump 230 for three weeks or more without needing to charge the battery 210. The exemplary battery 210 can include batteries used in golf carts or similar vehicles. In addition, the battery 210 can be charged by solar power via a solar panel 610 contained on the water source 120, which is described in more detail below with reference to FIG. 6.

Figure 3A:
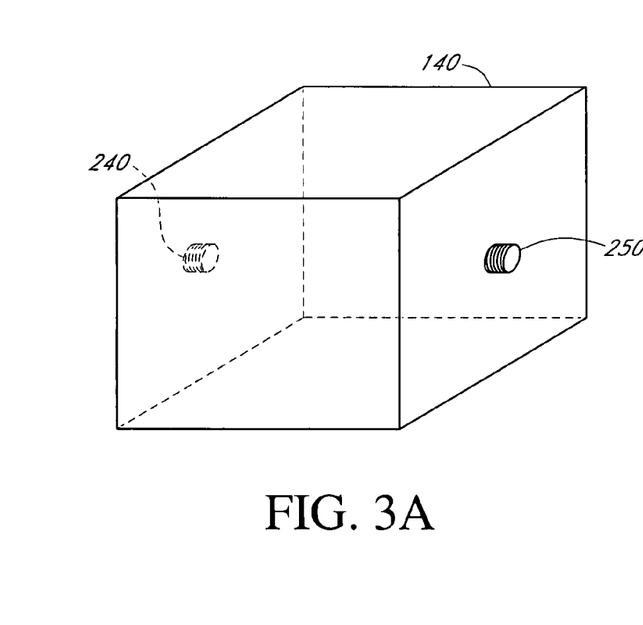
FIG. 3A is an isometric view of the outer shell of the exemplary portable self-contained concrete curing unit of FIG. 1.

FIG. 3A is an isometric view of the outer shell of the exemplary portable self-contained concrete curing unit 140 of FIG. 1. FIG. 3A illustrates that the concrete curing unit 140 is a self-contained unit and, as shown in FIG. 1, comprises at least a pump 230, a battery 210, and a controller 220. The concrete curing unit 140 as shown in FIG. 3A is cubical in configuration; however, the concrete curing unit 140 can be a variety of shapes such as a rectangular solid, cylinder, or uniquely dimensioned rectangular prism. The self-contained concrete curing unit 140 has respective male and female threaded connections on two sides of the cubical unit. These features can be seen in FIG. 3A as the inlet feature 240 and the outlet feature 250. Advantageously, the cubical and self-contained concrete curing unit 140 can be transported and moved easily without requiring extensive assembly or disassembly.

Figure 3B:
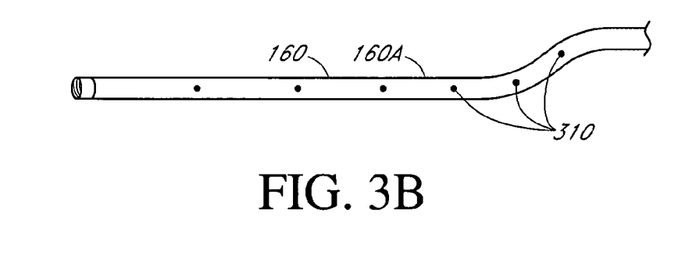
FIG. 3B is a front view of a moisture applicator hose with openings.

FIG. 3B is a front view of an exemplary moisture applicator hose 160A with openings 310. The exemplary moisture applicator 160, described with reference to FIG. 1, can be a variety of configurations, one of which is a moisture applicator hose 160A with openings 310. Once pressurized water is transported from the pump 230 to the moisture applicator 160, the moisture applicator hose 160A with openings 310 functions so as to release water from the openings 310 and onto a curing blanket and/or onto the curing concrete object. In one embodiment, the curing blanket is attached to the moisture applicator hose 160A. As a result, the burlap side of the curing blanket becomes saturated with water and the curing blanket maintains a desired moisture level on the concrete item being cured.

The spacing of the openings 310 in the moisture applicator hose 160A can vary. In one embodiment, the spacing is equal along the entire length of the moisture applicator hose 160A. In another embodiment, there is a greater distance between openings 310 along the portion of the hose near the moisture coupling unit 150 and a shorter distance between openings 310 along the portion of the hose further away from the moisture coupling unit 150. The unequal spacing orientation of this embodiment could result in an even moisture application along the entire length of the curing blanket since, in some cases, a greater amount of water will exit the openings 310 of the moisture applicator hose 160A closest to the moisture coupling unit 150.

In the embodiment shown in FIG. 3B, the moisture applicator hose 160A comprises an impervious hose material such as rubber, thermoplastic, Teflon, composite material, stainless steel, vinyl or any other suitable pervious material. In one embodiment, the hose 160A is comprised of a durable rubber material. In another embodiment, the openings 310 themselves are approximately 0.25 inches in diameter. However, the size of the openings 310 can be larger or smaller based on the particular needs of the user and the size of the hose 160A and burlap curing blanket.

Figure 3C:
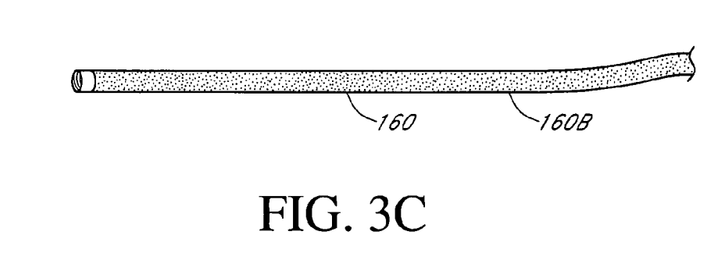
FIG. 3C is a front view of a pervious moisture applicator hose.

FIG. 3C is a front view of an exemplary pervious moisture applicator hose 160B. This type of moisture applicator 160B is similar in function to the moisture applicator hose 160A with openings 310 as described above, except that the hose body itself does not contain any measurable openings 310 but rather is composed of a pervious material which allows water to penetrate its outer surface. In such embodiment, water is transferred to the pervious moisture applicator hose 160B and the water seeps through the hose and maintains a desired moisture level on the adjacent curing blanket and/or concrete object. Advantageously, a pervious moisture applicator hose 160B has the ability to provide substantially even moisture distribution along a length of the hose 160B with less concern that a particular opening in the hose will become clogged or otherwise nonfunctional.

Figure 3D:
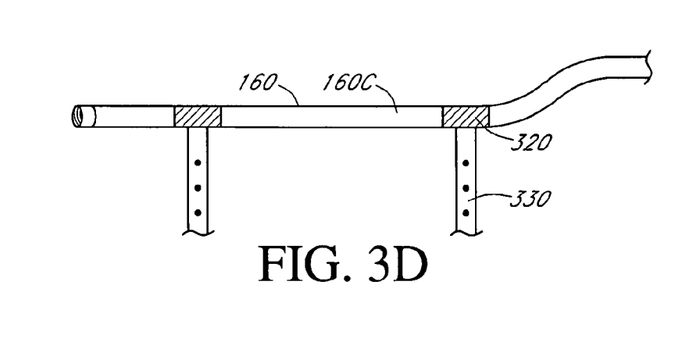
FIG. 3D is a front view of a moisture applicator hose with T-sections and downward extending hose segments.

FIG. 3D is a front view of a moisture applicator hose 160C with T-sections 320 and downward extending hose segments 330. In this embodiment, the moisture applicator 160 comprises a hose 160C with a plurality of T-sections 320 and a plurality of hose segments 330 extending vertically downward from such T-sections 320. In the embodiment of FIG. 3D, openings 310 are located on the downward extending segments 330. In other embodiments, openings 310 may also be located on the hose 160C. The configuration shown in FIG. 3D is advantageous when applied to concrete structures that are large and require multiple hose segments 330 to effectively maintain a sufficiently moist concrete curing structure.

Figure 4A:
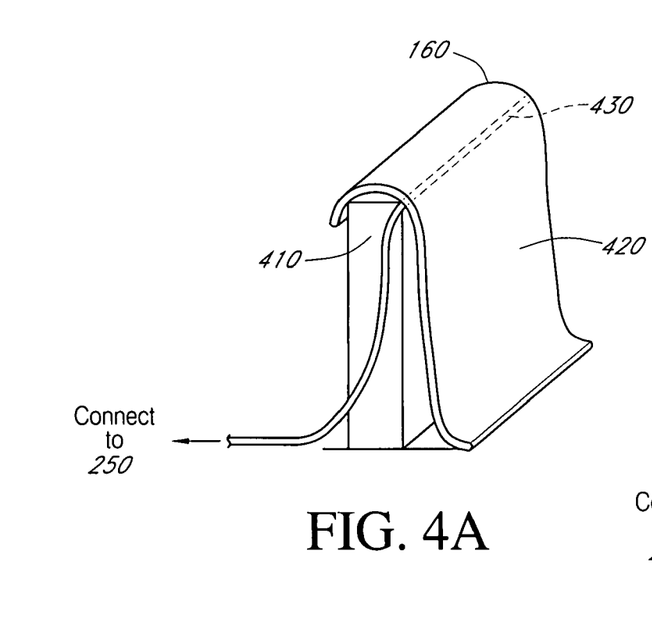
FIG. 4A is a perspective view of a moisture applicator as applied to a concrete wall.

FIG. 4A is a perspective view of a moisture applicator 160 as applied to a concrete wall 410. In one embodiment, the moisture applicator 160 comprises a hose 430 attached to the concrete wall 410 under a curing blanket 420. The exemplary curing blanket 420 comprises a burlap lower portion and a plastic upper portion. In another embodiment, the exemplary hose 430 is attached to the underside of the curing blanket 420 such that the hose 430 is in contact with the burlap side of the curing blanket 420. Moisture is applied automatically and periodically to the curing blanket 420 by utilizing the combination of the concrete curing unit 140 and the moisture applicator 160. This embodiment is particularly suited for curing large concrete walls, which are commonly developed at highway construction projects and commercial building construction projects. In one embodiment, the curing blanket 420 is a ten foot by forty foot rectangular section which hangs over one side of the concrete wall 410 as illustrated in FIG. 4A. Gravity causes water to displace downward from the horizontally configured hose 430 and to saturate the burlap side of the curing blanket 430 and/or the concrete wall 410, thereby maintaining an appropriate moisture level on the surface of the concrete wall 410.

Use of this embodiment may advantageously decrease manual labor typically required to cure concrete at a construction site. Previously, workers were required to manually lift the large, heavy curing blanket 420 and spray the underside of the blanket 420 with water from a large, heavy hose. According to this embodiment, workers no longer have to partake in such manual labor. Activating the controller according to certain timing schedules, as discussed in further detail in connection with FIG. 8 below, will result in an automatic and periodic system for curing concrete 100.

Figure 4B:
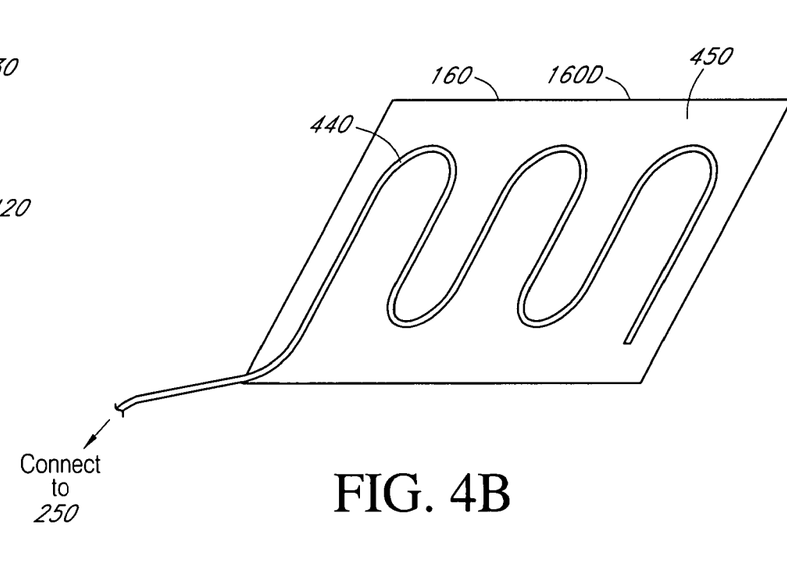
FIG. 4B is an isometric view of a moisture applicator with a moisture applicator hose configured in a winding pattern.

FIG. 4B is an isometric view of a moisture applicator 160D with a moisture applicator hose 440 configured in a winding pattern. In one embodiment, the winding pattern of the exemplary hose 440 comprises a plurality of connected U-shapes resembling a snake-like design as shown in FIG. 4B. In this embodiment of FIG. 4B, the hose 440 is connected to a concrete curing blanket 450 and acts to provide moisture to the curing blanket 450. In one embodiment, the moisture applicator 160D is utilized to cure a concrete floor. This configuration is advantageous because it permits a substantial portion of the moisture applicator 160D to maintain an adequate moisture level to facilitate in curing a concrete floor. If an exemplary hose without a winding configuration is applied to cure a concrete floor, the hose may not be able to provide moisture to a substantial portion of the surface of the curing blanket since the exemplary hose would likely be confined to a narrow portion of the curing blanket. The winding configuration of the hose 440 covers a larger portion of surface area of the curing blanket and thereby facilitates in maintaining proper moisture conditions on the curing blanket 450.

In one embodiment, the moisture applicator hose 440 is placed within the concrete curing blanket 450 such that the hose 440 is located between the burlap lower portion of the curing blanket 450 and the plastic upper portion of the curing blanket 450. In such embodiment, the hose 440 discharges water so as to saturate the lower portion of the curing blanket 450 and facilitate in maintaining sufficient moisture on the surface of the concrete object. In another embodiment, the moisture applicator hose 440 is not configured in a winding pattern. For example, the hose 440 can be configured in a spiral coil pattern or a rectangular box pattern. The hose 440 can be configured in any pattern or shape that the user chooses to achieve desired moisture conditions during the concrete curing process. Advantageously, the user can adapt the moisture applicator 160D to the user's particular needs and thereby properly cure a variety of shapes and sizes of concrete objects.

Figure 5:
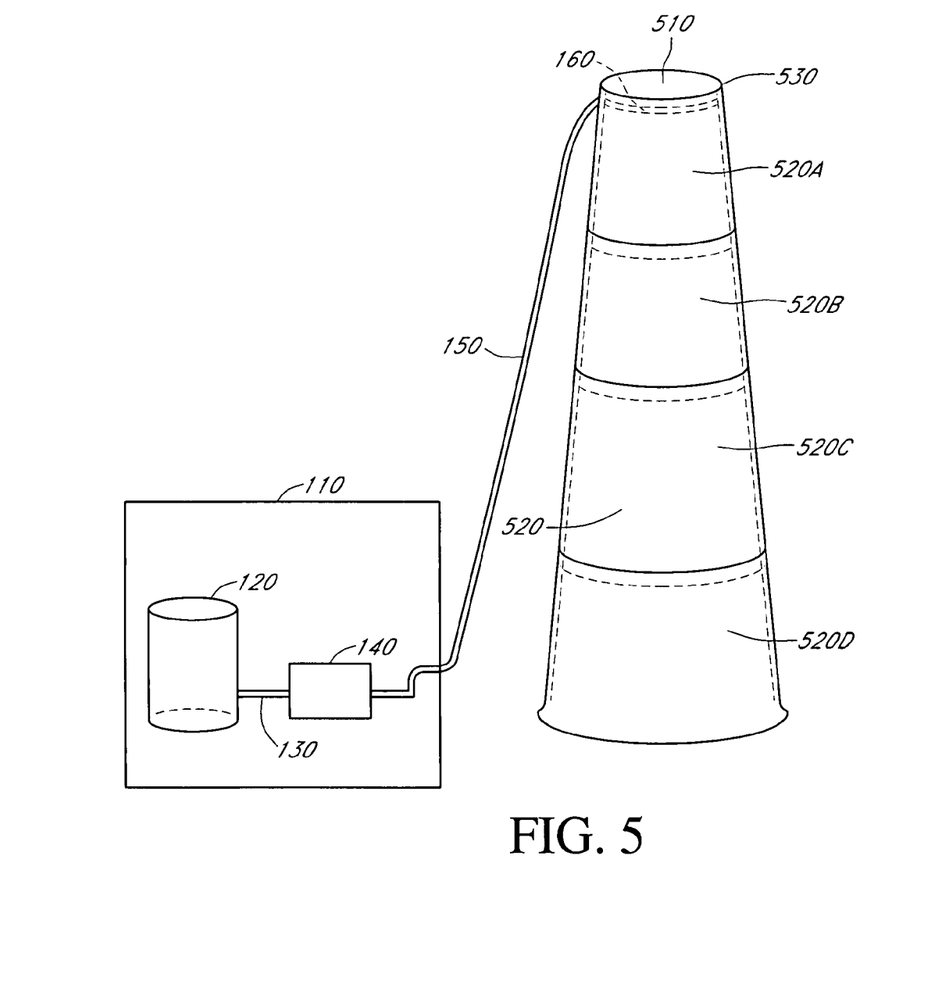
FIG. 5 is a diagram of a portable system for automatically and periodically curing concrete as applied to a concrete column.

FIG. 5 is a block diagram of a portable system for automatically and periodically curing a concrete column 510. Large concrete columns, such as those used to support highway overpasses or to provide support for large buildings, are typically composed of concrete and should be cured properly. It is advantageous to cure such columns at their final location since transportation costs for such large and heavy concrete structures can be high. The portable system of curing concrete 100 enables concrete columns 510 to be cured at their final location. As described above with reference to FIG. 1, the movable chassis 110 can be transported to many locations to facilitate in the curing of such concrete items.

In one embodiment, a plurality of curing blankets 520A, 520B, 520C, 520D are placed in series so as to cover the surface of the concrete column 510. The exemplary curing blankets 520 are ten feet by forty feet in dimension and are attached to one another such that the underside of a lower curing blanket overlaps the top side of an upper curing blanket. Overlapping adjacent curing blankets in this manner results in a substantially continuous curing blanket surface which maintains contact with the large concrete column 510. In one embodiment, the hose of the moisture applicator 160 is wound around the circumference of a top portion 530 of the concrete column 510. As such, the moisture applicator 160 is between the upper most curing blanket 520A and the column 510. As the concrete curing unit 140 delivers pressurized water automatically and periodically to the moisture applicator 160, water exits the hose and displaces vertically downward under the lower portions of the column 510 covered by curing blankets 520B, 520C, 520D. In other embodiments, additional moisture applicators 160 may be placed under one or more curing blankets 520B, 520C, 520D, as necessary. Advantageously, overlapping adjacent curing blankets as shown in FIG. 5 facilitates the proper curing conditions for large and tall concrete structures such as concrete columns without utilizing significant manual labor.

Figure 6:
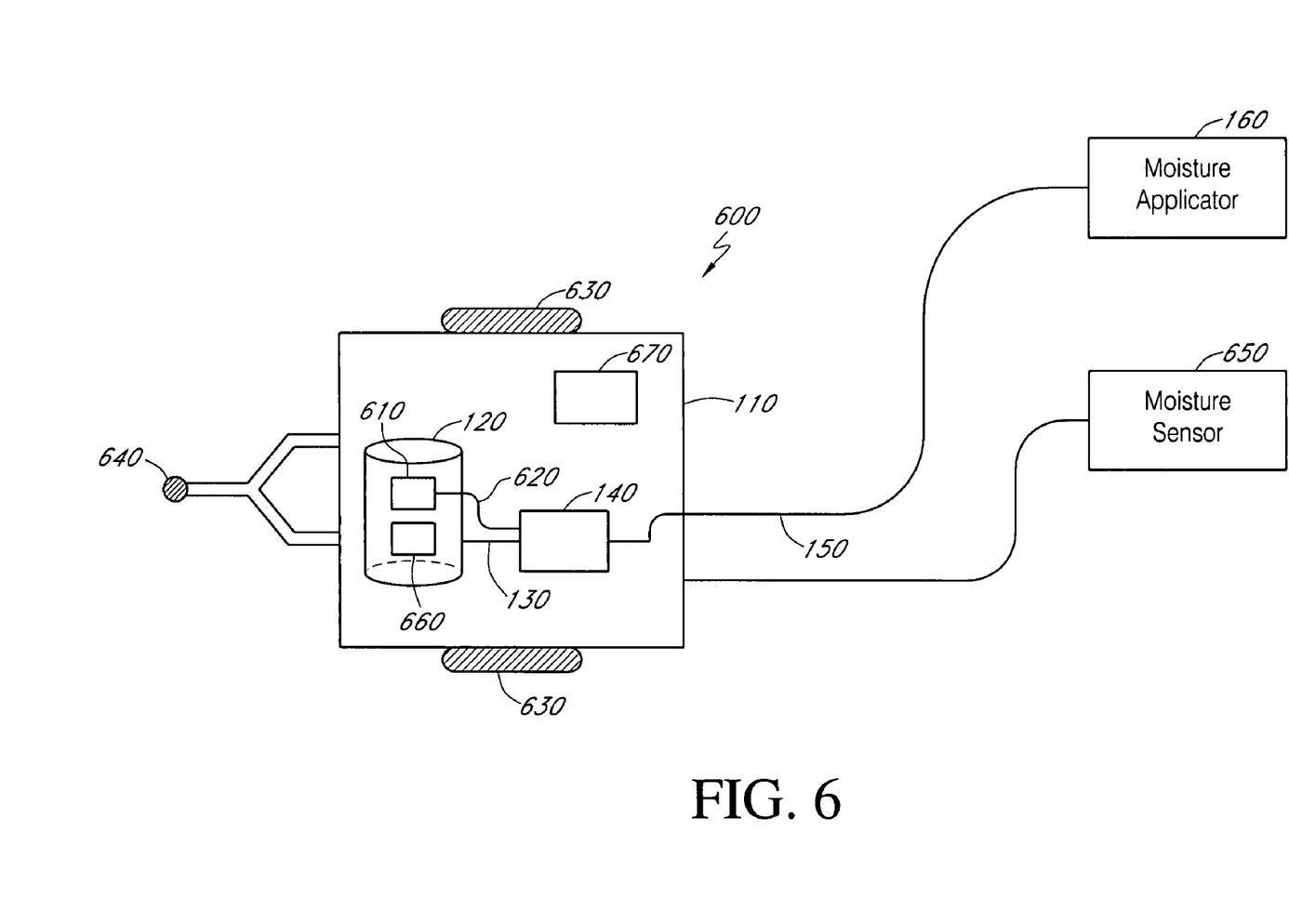
FIG. 6 is a block diagram of a portable system for automatically and periodically curing concrete containing several additional components of the system not illustrated in FIG. 1.

FIG. 6 is a block diagram of a portable system 600 for automatically and periodically curing concrete containing several additional components of the system not illustrated in FIG. 1. The additional components may include any or all of the following: a solar panel 610, a solar coupling unit 620, trailer wheels 630, a trailer hitch 640, a moisture sensor 650, a water level sensor 660, and/or a pager 670. These additional components may be included in any particular embodiment of the concrete curing system 600 and any particular combination of such components may be included or excluded from such concrete curing system 600. Therefore, the description of each set of components below does not limit the concrete curing system 600 to include any particular component or to exclude any particular component from such particular embodiment of the concrete curing system 600.

In one embodiment, the portable curing system 600 comprises a solar panel 610 and a solar coupling unit 620. In such embodiment, the solar panel 610 is attached to the water source 120. In another embodiment, the water source 120 is a water tank and the solar panel 610 is located on the outer surface of the water tank such that the solar panel 610 is exposed to the ambient atmosphere. The exemplary solar panel 610 functions to covert sunlight into electricity by using Photo-Voltaic cells. The solar coupling unit 620 transfers such electricity to the concrete curing unit 140 and in particular to the battery 210. In one embodiment, which will be discussed in detail below in reference to FIG. 7, a first solar charge controller 710 and second solar charge controller 750 are used to regulate the electricity produced by the sunlight and to correspondingly power the battery 210. The solar panel 610 is beneficial to the portable curing system since it provides a means to replenish power within the battery 210. Advantageously, the solar panel 610 reduces the need for an external source of power and further enhances the portable and self-contained nature of the concrete curing system 600. In one embodiment, the concrete curing system 600 is utilized in a geographical location that is subject to a sufficient amount of sunlight.

In another embodiment of the portable curing system 600, a movable chassis 110 comprises a trailer device including trailer wheels 630 and a trailer hitch 640. In one embodiment, the water source 120 and the concrete curing unit 140 are mounted on the trailer device. The trailer hitch 640 of the trailer device is typically attached to the rear end of a motor vehicle equipped for accepting such trailer hitches. The trailer wheels 630 permit the trailer device to be towed by a motor vehicle. Advantageously, the movable chassis 110 can be transported from one location to another location providing for a portable system of curing concrete.

This embodiment comprising the trailer wheels 630 and the trailer hitch 640 enables the curing system 600 to be moved to a remote location for aiding in curing of concrete objects, rather than requiring curing concrete in one particular location and then transporting the heavy concrete object to its desired destination. As a result, transportation costs may be reduced and the time needed to complete a particular project involving curing concrete may likewise be reduced. In addition, by including the water source 120 on the movable chassis 110 in this particular embodiment, the concrete curing system 100 may be utilized in any location regardless of whether the location has an accessible water source. Some construction projects take place in remote locations where it would take considerable time and effort to access a water source for an extended period of time. This embodiment enables concrete to be cured at remote locations since the water source 120 is included on the movable chassis 10 and can be transported to a desired concrete curing location.

In one embodiment, the portable concrete curing system 600 contains a moisture sensor 650 that monitors the water level on the moisture applicator 160. For example, the moisture sensor 650 detects how much moisture is on the surface of the concrete curing blanket. If the moisture level on the blanket is sufficient, then the moisture sensor 650 will relay a signal back to the concrete curing unit 140 and the concrete curing unit 140 will no longer provide pressurized water to the moisture applicator 160. When the moisture level on the blanket falls below a certain level, then the concrete curing unit 140 is electronically instructed to reapply water to the moisture applicator 160. In one embodiment, water is pumped to the moisture application 160 until a desired moisture level is reached on the moisture applicator 160. In another embodiment, the moisture applicator 160 contains a moisture sensor 650 that monitors a moisture level on the surface of the curing concrete object itself. In such embodiment, the sensor 650 may similarly relay a signal back to the concrete curing unit 140 when the water level on the surface of the concrete object falls below a minimally suitable moisture level. Any type of moisture sensor known in the art may be used in combination with the systems and methods described herein.

In another embodiment, the water source 120 is a water tank with a water level sensor 660 attached thereon. The function of the water level sensor 660 is to monitor the water level in the water tank and notify the user when the water level falls below a certain threshold level. Advantageously, the water level sensor 660 permits an individual to operate the portable concrete curing unit 600 having knowledge that the moisture applicator 160 will have a sufficient water source 120 so long as the water level sensor 660 has not been activated. As a result, the portable concrete curing unit 600 can be operated with minimal human supervision and involvement.

In one embodiment, the portable concrete curing system 600 may contain a pager 670 that alerts the user of the concrete curing system 600 that either the water level in the water tank has fallen below a threshold level and/or the moisture level on the curing concrete surface has fallen below a threshold level. A pager 670, for example, may transmit a signal to a remote paging device such as a pager, cellular telephone, personal digital assistant, or computer. In one embodiment, the remote paging device is located near the user of the concrete curing system 600 so that the user can be immediately notified via the pager 670 when the moisture level on the concrete object or the water level in the water tank is too low.

Alternatively, or in addition to, the curing system 600 could contain certain signals that activate a light alert when the water in the tank is too low or the moisture on the curing concrete surface is too low. In another embodiment, the curing unit 140 itself contains a pager 670 and/or lights that alert the user when the water level in the water tank falls below a minimal threshold level and/or the moisture on the curing concrete surface falls below minimal threshold level. In another embodiment, the curing system 600 contains a speaker or siren that produces an audio noise when the water level in the tank is too low or the moisture level on the concrete object is too low. Advantageously, these pager 670 and/or alert systems allow the user to operate the concrete curing system 600 with minimal human supervision and involvement.

In another embodiment, additional sensors may be implemented in the curing system 600 in order to detect faults of the systems. For example, sensors may monitor operation of the pumps, solar power devices, solenoids, controllers, batteries, or any other components associated with the curing system 600. Alerts, such as electrical paging, audio, or visual alerts, for example, may be configured to activate in response to receiving input from one or more of the additional sensors.

Figure 7:
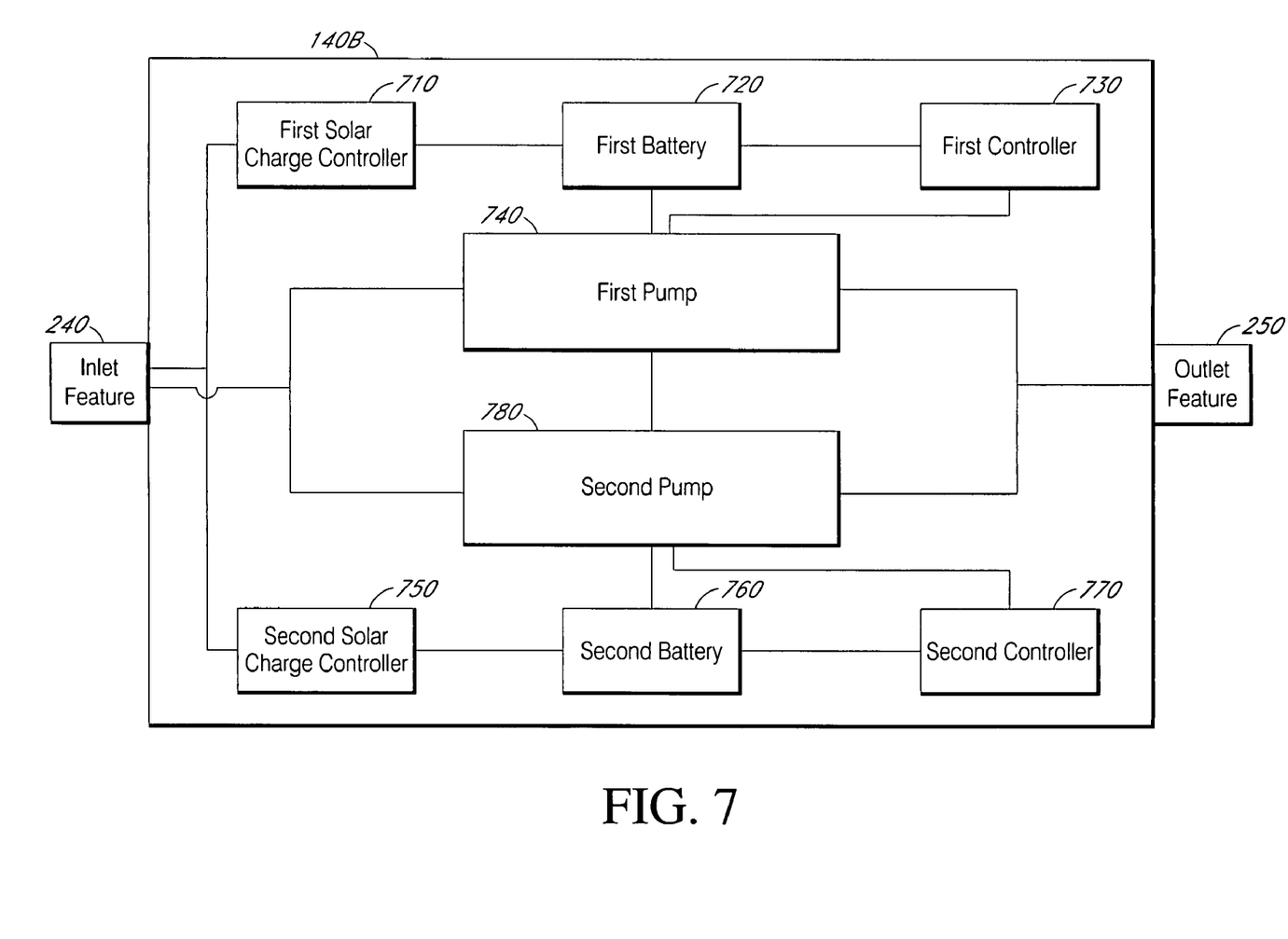
FIG. 7 is a block diagram illustrating components of the portable self-contained concrete curing unit of FIG. 1 containing a redundant set of components.

FIG. 7 is a block diagram illustrating components of a portable self-contained concrete curing unit 140B that may be used, for example, in place of the concrete curing unit 140A, as shown in FIG. 2. In the embodiment shown in FIG. 7, the concrete curing unit 140B comprises a redundant set of components. In this particular embodiment, the concrete curing unit 140B has a first set of components comprising a first solar charge controller 710, first battery 720, first controller 730, and first pump 740. In addition, the concrete curing unit has a second set of components comprising a second solar charge controller 750, second battery 760, second controller 770, and second pump 780. This redundant configuration is advantageous because it provides a backup set of components that can operate in the event that the first set of components fails to operate. Another advantage of the embodiment illustrated in FIG. 7 is that the user can individualize the performance of their concrete curing unit 140B to their particular needs by utilizing this redundant configuration. A user can choose to operate both sets of components simultaneously or can choose to alternate the use of the first set of components and the second set of components thereby increasing the effective useful life of their concrete curing unit 140. In additional embodiments, the concrete curing unit 140 contains a plurality of sets of components such that the concrete curing unit 140 could, for example, contain a third set of components, fourth set of components, and/or fifth set of components.

The embodiment illustrated in FIG. 7 includes a first solar charge controller 710 and a second solar charge controller 750. A solar charge controller functions so as to use solar power gained from the solar panel 610, as shown in FIG. 6, to charge the first battery 720 of the concrete curing unit 140B. For example, the first solar charge controller 710 is connected to the solar panel 610 by the solar coupling unit 620, which are illustrated in FIG. 6. The first solar charge controller 710 is coupled to the first battery 720, which is coupled to first controller 730 and the first pump 740. A variety of solar charge controllers may be used in the concrete curing unit 140B. However, by way of example, one particular solar charge controller that may be used is the SunGuard™ Solar Controller made by the Morningstar Corporation.

The first controller 730 and the second controller 770 of the concrete curing unit 140B may operate in the same manner as the controller 220 of the concrete curing unit 140A. The controller 220 is discussed in detail below with reference to FIG. 8. The first controller 730 and the second controller 770 function to periodically activate the first pump 740 and the second pump 780, respectively, so as to periodically apply moisture to the concrete object that is being cured. The first controller 730 and the second controller 770 may also be configured to automatically discharge pressurized water from the first pump 740 and the second pump 780, respectively, in accordance with a particular time schedule set in advance by the user. In one embodiment, the redundant systems in the curing unit 140B may be set to alternatively provide water to an applicator. The on time, off time, and/or schedule for each system may be adjusted to any other suitable schedule for a particular curing task. Therefore, the combination of the controllers 730, 770 and pumps 740, 780 of curing unit 140B automatically and periodically provide water to the moisture applicator 160, as shown in FIG. 1, which assists in properly curing concrete items. Advantageously, manual labor associated with spraying the curing blanket with a large hose is not necessary and human error inherent in the curing process is decreased since there is less reliance on human involvement due to the automatic nature of applying water to the curing concrete object provided by the present embodiment.

Figure 8:
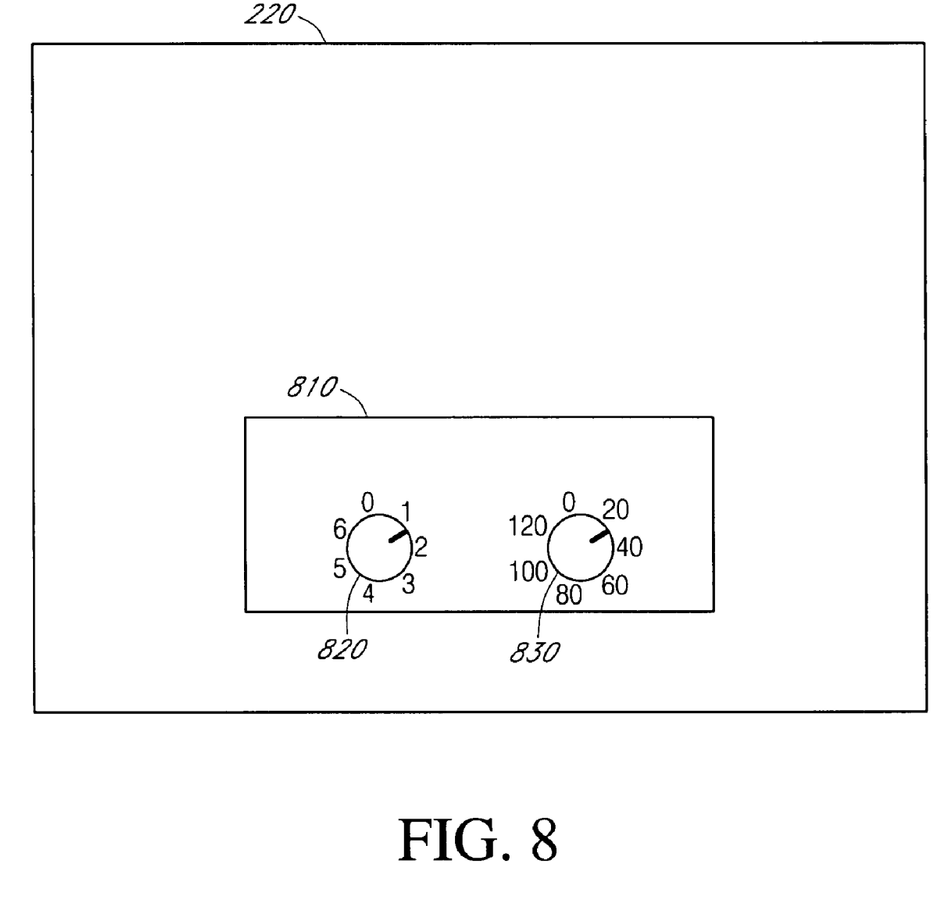
FIG. 8 is a block diagram illustrating components of the exemplary controller of FIG. 2.

FIG. 8 is a block diagram illustrating components of the exemplary controller 220 of FIG. 2. The exemplary controller 220 contains a timer 810, an active controller 820, and an inactive controller 830. As described above, the controller 220 advantageously enables the concrete curing system to apply moisture to curing concrete in an automatic and periodic manner. The controller 220 may be powered by the battery 210 and may be directly coupled to the pump 230, as shown with reference to FIG. 2. In one embodiment, the controller 220 functions by activating the pump 230 so as to provide pressurized water automatically and according to a particular schedule that the user has programmed the controller 220 to follow.

In the embodiment shown in FIG. 8, the timer 810 comprises the active controller 820 and the inactive controller 830. In this embodiment, the timer 810 sends electronic signals to the pump 230 which in turn sends pressurized water to the moisture applicator 160. The interplay between the active controller 820, and the corresponding operational state of the pump 230, and the inactive controller 830, and the corresponding non-operational state of the pump 230, result in an automated system wherein the pump 230 periodically sends pressurized water to the moisture applicator 160 so as to provide moisture to curing concrete according to a particular desired time schedule.

In one embodiment, the timer 810 contains a range of time for the active controller 820 ranging from zero to six minutes. Correspondingly, the timer 810 contains a range of time for the inactive controller 830 ranging from zero to one-hundred twenty minutes. In one particular embodiment, the user may set the active controller 820 to ninety seconds and the inactive controller to thirty minutes. As a result, the concrete curing system 100, as shown in FIG. 1, will apply moisture to the moisture applicator 160 for ninety seconds and then will rest for thirty minutes before applying moisture for another ninety second time interval. This pattern will repeat continuously for so long as the user keeps the concrete curing system in this operational state and does not change the time on either the active controller 820 or the inactive controller 830 of the controller 220. Advantageously, this system of automatically and periodically applying moisture to curing concrete by use of a controller 220 permits the user to reduce the use of manual labor in the concrete curing process. As a result of reducing manual labor, costs for labor may decrease and the possibility of human error in the concrete curing process may also decrease.

The timer 810 may comprise a variety of displays and functions. In one embodiment, the active controller 820 and inactive controller 830 are dials that may be rotated by the user to set particular on and off time periods. In another embodiment, the timer 810 comprises a digital display. In yet another embodiment, the timer 810 contains electronic circuitry so as to electronically perform the timing function for both the active controller 820 and the inactive controller 830 and send signals to the pump 230 of the concrete curing unit 140 indicating when the pump 230 is to send pressurized water to the moisture applicator 160.

In another embodiment, the controller 220 contains a sensor and alarm system which can detect if the pump 230 is not working properly. If the pump 230 happens to malfunction, an alarm is triggered which would notify the user that the concrete curing unit 140 is not operating properly. This allows the user of the concrete curing system 100 to have confidence that the system will operate automatically and periodically unless the user is notified otherwise by the sensor and alarm system. In addition, the alarm can be connected to a wireless device which would notify the user of the particular problem even if the user is in a remote location. As a result, the user does not need to be at the particular curing site to become aware of an operational breakdown and can freely leave the concrete curing system 100 to operate during the daytime or nighttime.

The foregoing description details certain embodiments of a portable system for automatically and periodically applying moisture to curing concrete. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A self-contained concrete curing apparatus that is adapted to be moved to remote locations at the site of concrete construction so as to be able to provide water from a water source onto a concrete object to aid in curing the concrete object, the apparatus comprising:
    a portable power source;
    an applicator that applies moisture to the concrete object;
    a pump that is powered by the portable power source, wherein the pump receives water from the water source and provides pressurized water to the applicator so that moisture is applied to the concrete object;
    a controller electronically coupled to the pump and configured to control activation of the pump so that the pump only periodically applies moisture to the concrete object;
    a movable chassis onto which the power source, the pump, and the controller are mounted, wherein the chassis is sized so as to be movable between construction locations such that the apparatus can automatically apply moisture to the concrete object over a period of time to facilitate curing of the concrete object.

2. The apparatus of claim 1, wherein the portable power source is a battery.

3. The apparatus of claim 2, further comprising a second battery connected in series with the first battery.

4. The apparatus of claim 2, further comprising a solar panel for charging the battery.

5. The apparatus of claim 4, further comprising a solar charge controller coupled to the solar panel for converting sunlight into electricity in order to charge the battery.

6. The apparatus of claim 1, wherein the applicator comprises a concrete curing blanket.

7. The apparatus of claim 1, wherein the applicator comprises a hose with a plurality of openings.

8. The apparatus of claim 1, wherein the applicator comprises a pervious hose.

9. The apparatus of claim 1, further comprising a moisture sensor for monitoring moisture on the concrete object.

10. The apparatus of claim 1, wherein the controller comprises an active controller and an inactive controller that define time periods for the pump to be on and off, respectively.

11. The apparatus of claim 10, wherein the controller is configurable by the user such that a desired activation period can be set via the active controller and a desired deactivation period can be set via the inactive controller.

12. The apparatus of claim 10, wherein the active controller and the inactive controller are dials.

13. The apparatus of claim 1, wherein the water source is a water tank.

14. The apparatus of claim 13, further comprising a water level sensor that monitors the water level in the water tank and notifies the user when the water in the water tank falls below a certain threshold level.

15. The apparatus of claim 13, wherein the water tank is mounted on the movable chassis.

16. The apparatus of claim 1, wherein the movable chassis is a trailer that can be towed from one location to another location.

17. The apparatus of claim 1, further comprising a second power source, pump, and controller.

18. The apparatus of claim 1, wherein the water source has a capacity of at least 750 gallons.

19. The apparatus of claim 1, wherein the concrete object comprises at least one of: a wall, a column, and flat concrete.

20. The apparatus of claim 1, wherein the pump is an electric pump.

21. A system for automatically wetting a concrete structure being built remote in the field, the system comprising:
    a chassis that is portable via an automotive vehicle;
    a water pump that is positioned within the chassis;
    a water reservoir that can be coupled to the water pump positioned within the chassis so that the water pump can pump water from the water reservoir;
    an applicator that can be positioned adjacent the concrete object and is coupled to the water pump so as to apply water to the concrete object during a cure period so as to maintain a desired degree of moisture on the concrete object during the cure period; and
    a controller that is positioned within the chassis wherein the controller controls the operation of the pump such that the controller can be used to periodically induce the pump to pump the water to the applicator so as to maintain a desired degree of moisture on the concrete object wherein the controller is programmable so that the controller can be programmed to operate without human intervention during the cure period.

22. The system of claim 21, wherein the chassis includes a plurality of wheels permitting the chassis to be rolled over the ground to the location of the concrete object.

23. The system of claim 22, wherein the water reservoir is mounted to the chassis.

24. The system of claim 23, wherein the water reservoir holds at least 750 gallons of water.

25. The system of claim 21, wherein the applicator comprises a planar flexible applicator that can be positioned over the concrete object.

26. The system of claim 25, wherein the applicator comprises a blanket that is soaked with water when coupled to the water pump so as to diffuse water over the concrete object.

27. The system of claim 21, wherein the applicator includes one or more hoses arranged under a surface of a curing blanket so as to distribute the water over the outer surface of the concrete object under the curing blanket.

28. The system of claim 21, wherein the controller includes controls that allow an individual to select a first time period where the pump will provide water to the applicator and a second time period where the pump will be inhibited from providing water and wherein the controller then automatically enables the pump during the first time period and disables the pump during the second time period without human intervention during the cure period.

29. The system of claim 21, further comprising a moisture sensor that senses the moisture on the concrete object and wherein the controller is programmed to enable the water pump when the moisture sensor senses moisture on the concrete is below a first threshold and wherein the controller automatically enables and disables the water pump in response to the moisture sensor without human intervention during the cure period.

30. The system of claim 29, further comprising a pager that transmits a signal to a remote paging device when the moisture sensor senses moisture on the concrete is below a first threshold without human intervention during the cure period.

31. The system of claim 30, wherein the remote paging device comprises one of: a pager, a cellular telephone, a personal digital assistant, and a computer.

32. The system of claim 29, wherein a visual indicator is coupled to the moisture sensor and is activated when the moisture sensor senses moisture is below a first threshold level without human intervention during the cure period.

33. The system of claim 29, wherein an audio indicator is coupled to the moisture sensor and is activated when the moisture sensor senses moisture is below a first threshold level without human intervention during the cure period.

34. The system of claim 21, further comprising a water level sensor that senses the water level of the water reservoir without human intervention during the cure period.

35. The system of claim 34, further comprising a pager that transmits a paging signal to a remote paging device when the water level in the water reservoir falls below a first threshold without human intervention during the cure period.

36. The system of claim 34, wherein a visual indicator is coupled to the water level sensor and is activated when the water level sensor senses the water level of the water reservoir is below a first threshold level without human intervention during the cure period.

37. The system of claim 34, wherein an audio indicator is coupled to the water level sensor and is activated when the water level sensor senses the water level of the water reservoir is below a first threshold level without human intervention during the cure period.

38. The system of claim 21, wherein the cure period is approximately three days or more.

39. A portable concrete curing apparatus for maintaining a desired moisture level on a concrete object that is curing, the apparatus comprising:
   a portable power source;
   a timer coupled to the power source for generating an activation signal during a periodic activation period; and
   a pump electronically coupled to the timer, wherein the pump is coupled to a water source and expels pressurized water drawn from the water source during the periodic activation period in response to receiving the activation signal, the pump being coupled to an applicator that is at least partly proximate the curing concrete object so that moisture is applied to the curing concrete object during the activation period.

40. An apparatus for automatically wetting a concrete object, the apparatus comprising:
   a water pump configured for attachment to a water source;
   an applicator having a first portion coupled to the water pump and a second portion positioned adjacent a concrete object, wherein the applicator is configured to apply water to the concrete object; and
   a controller comprising a first timer and a second timer, wherein an activation time period indicated by the first timer is user-changeable and a deactivation time period indicated by the second timer is user-changeable, wherein the controller is configured to automatically repeat, without user intervention, the operations of
      activating the pump for the activation time period during which water is delivered to the concrete object via the applicator and then
      deactivating the pump for the second time period during which water is not delivered to the concrete object via the applicator.

* * * * *